United States Patent [19]

Legvold et al.

[11] Patent Number: 5,701,429
[45] Date of Patent: Dec. 23, 1997

[54] METHOD AND SYSTEM FOR MAINTAINING CONCURRENT DATA ACCESS DURING DEVICE UPGRADE

[75] Inventors: Vernon J. Legvold, Tucson, Ariz.; Julia Liu, Sunnyvale, Calif.; Carol S. Michod, Tucson, Ariz.; Chan Yiu Ng, San Jose, Calif.; William G. Sherman, II, Tucson, Ariz.; Jeffrey R. Steffan, San Jose; Steven R. Van Gundy, Gilroy, both of Calif.

[73] Assignee: International Business Machines Corporation, Armonk, N.Y.

[21] Appl. No.: 698,825

[22] Filed: Aug. 16, 1996

Related U.S. Application Data

[63] Continuation of Ser. No. 261,797, Jun. 20, 1994, abandoned.
[51] Int. Cl.$^6$ .................................................. G06F 12/02
[52] U.S. Cl. ........................................ 395/441; 395/497.01
[58] Field of Search .................................. 395/438, 439, 395/441, 497.01, 182.05, 822, 823, 828, 829, 492

[56] References Cited

U.S. PATENT DOCUMENTS

| | | | |
|---|---|---|---|
| 3,964,056 | 6/1976 | Charpentier et al. | 395/182.08 |
| 4,092,732 | 5/1978 | Ouchi | 395/182.03 |
| 4,608,688 | 8/1986 | Hansen et al. | 395/182.04 |
| 4,667,326 | 5/1987 | Young et al. | 371/39.1 |
| 4,825,403 | 4/1989 | Gershenson et al. | 360/52 |
| 4,942,579 | 7/1990 | Goodlander et al. | 371/51.1 |
| 4,993,030 | 2/1991 | Krakaner et al. | 371/40.1 |
| 5,051,887 | 9/1991 | Berger et al. | 395/489 |
| 5,140,592 | 8/1992 | Idleman et al. | 395/182.03 |
| 5,148,432 | 9/1992 | Gordon et al. | 395/182.05 |
| 5,239,659 | 8/1993 | Rudeseal et al. | 395/800 |
| 5,267,242 | 11/1993 | Lavallee et al. | 395/182.05 |
| 5,357,509 | 10/1994 | Ohizumi | 395/182.05 |
| 5,390,313 | 2/1995 | Yanai et al. | 395/439 |
| 5,430,855 | 7/1995 | Walsh et al. | 395/830 |

OTHER PUBLICATIONS

D. Patterson et al., "A Case for Redundant Arrays of Inexpensive Disks (RAID)" pp. 109–116.
Garth A. Gibson, "Performance and Reliability in Redundant Arrays of Inexpensive Disks", pp. 381–391.
The Interpreter "Competition Heats Up in Growing Fault-Tolerant Computer Market", Mini-Micro Systems, Jan. 1994.
James A. Katzman, Tandem Computers "The Tandem 16: A Fault-Tolerant Computing System", Chapter 29, 1977, pp. 470–485.

*Primary Examiner*—Eddie P. Chan
*Assistant Examiner*—Kevin L. Ellis
*Attorney, Agent, or Firm*—Esther E. Klein; Andrew J. Dillon

[57] ABSTRACT

A system and method for changing the number of logical volumes in a drawer in a rack in a direct access storage device subsystem is disclosed. The method and system are able to change the number of logical volumes without disrupting access to the other logical volumes in the rack. Channel connection addresses, which are logical volume addresses as known by the CPUs, are freed by removing the old drawer and then are mused. If the new drawer has more logical volumes than the old drawer, the next unused channel connection addresses are used with the new drawer. In a subsystem having a storage controller for providing control for a plurality of direct access storage devices, the logical volumes are spread across multiple physical devices. The storage controller maintains configuration data for the entire subsystem in redundant, non-volatile storage locations reserved specifically for its use. Each logical volume address for the rack is set by the drawer location and the logical sequence of the volumes within the drawer. As drawers are installed, the control unit sequentially assigns the volume addresses for the control unit and the channel connection addresses for the CPUs.

13 Claims, 16 Drawing Sheets

| Dev Group | 01 | | | |
|---|---|---|---|---|
| Vol Addr | '00'x | '01'x | | |
| Vol Status | Online | Online | | |
| Phy Addr | 01-01 | 01-02 | | |
| Dev Group | 02 | | | |
| Vol Addr | '02'x | '03'x | | |
| Vol Status | Online | Online | | |
| Phy Addr | 02-01 | 02-02 | | |
| Dev Group | 03 | | | |
| Vol Addr | '04'x | '05'x | | |
| Vol Status | Online | Online | | |
| Phy Addr | 03-01 | 03-02 | | |
| Dev Group | 04 | | | |
| Vol Addr | '06'x | '07'x | | |
| Vol Status | Online | Online | | |
| Phy Addr | 04-01 | 04-02 | | |
| Dev Group | 05 | | | |
| Vol Addr | '08'x | '09'x | | |
| Vol Status | Online | Online | | |
| Phy Addr | 05-01 | 05-02 | | |
| Dev Group | 06 | | | |
| Vol Addr | '0A'x | '0B'x | | |
| Vol Status | Online | Online | | |
| Phy Addr | 06-01 | 06-02 | | |
| Dev Group | 07 | | | |
| Vol Addr | '0C'x | '0D'x | | |
| Vol Status | Online | Online | | |
| Phy Addr | 07-01 | 07-02 | | |
| Dev Group | 08 | | | |
| Vol Addr | '0E'x | '0F'x | | |
| Vol Status | Unused | Unused | | |
| Phy Addr | 08-01 | 08-02 | | |

*Fig. 3A*

| Dev Group | 01 | | | |
|---|---|---|---|---|
| Vol Addr | '0E'x | '0F'x | | |
| Vol Status | Unused | Unused | | |
| Phy Addr | 01-01 | 01-02 | | |
| Dev Group | 02 | | | |
| Vol Addr | '02'x | '03'x | | |
| Vol Status | Online | Online | | |
| Phy Addr | 02-01 | 02-02 | | |
| Dev Group | 03 | | | |
| Vol Addr | '04'x | '05'x | | |
| Vol Status | Online | Online | | |
| Phy Addr | 03-01 | 03-02 | | |
| Dev Group | 04 | | | |
| Vol Addr | '06'x | '07'x | | |
| Vol Status | Online | Online | | |
| Phy Addr | 04-01 | 04-02 | | |
| Dev Group | 05 | | | |
| Vol Addr | '08'x | '09'x | | |
| Vol Status | Online | Online | | |
| Phy Addr | 05-01 | 05-02 | | |
| Dev Group | 06 | | | |
| Vol Addr | '0A'x | '0B'x | | |
| Vol Status | Online | Online | | |
| Phy Addr | 06-01 | 06-02 | | |
| Dev Group | 07 | | | |
| Vol Addr | '0C'x | '0D'x | | |
| Vol Status | Online | Online | | |
| Phy Addr | 07-01 | 07-02 | | |
| Dev Group | 08 | | | |
| Vol Addr | '00'x | '01'x | | |
| Vol Status | Online | Online | | |
| Phy Addr | 08-01 | 08-02 | | |

*Fig. 3B*

| Dev Group | 01 | | | |
|---|---|---|---|---|
| Vol Addr | | | | |
| Vol Status | | | | |
| Phy Addr | | | | |
| Dev Group | 02 | | | |
| Vol Addr | '02'x | '03'x | | |
| Vol Status | Online | Online | | |
| Phy Addr | 02-01 | 02-02 | | |
| Dev Group | 03 | | | |
| Vol Addr | '04'x | '05'x | | |
| Vol Status | Online | Online | | |
| Phy Addr | 03-01 | 03-02 | | |
| Dev Group | 04 | | | |
| Vol Addr | '06'x | '07'x | | |
| Vol Status | Online | Online | | |
| Phy Addr | 04-01 | 04-02 | | |
| Dev Group | 05 | | | |
| Vol Addr | '08'x | '09'x | | |
| Vol Status | Online | Online | | |
| Phy Addr | 05-01 | 05-02 | | |
| Dev Group | 06 | | | |
| Vol Addr | '0A'x | '0B'x | | |
| Vol Status | Online | Online | | |
| Phy Addr | 06-01 | 06-02 | | |
| Dev Group | 07 | | | |
| Vol Addr | '0C'x | '0D'x | | |
| Vol Status | Online | Online | | |
| Phy Addr | 07-01 | 07-02 | | |
| Dev Group | 08 | | | |
| Vol Addr | '00'x | '01'x | | |
| Vol Status | Online | Online | | |
| Phy Addr | 08-01 | 08-02 | | |

*Fig. 3C*

| | | | | |
|---|---|---|---|---|
| Dev Group | 01 | | | |
| Vol Addr | '0E'x | '0F'x | | |
| Vol Status | Unused | Unused | | |
| Phy Addr | 01-01 | 01-02 | 01-03 | 01-04 |
| Dev Group | 02 | | | |
| Vol Addr | '02'x | '03'x | | |
| Vol Status | Online | Online | | |
| Phy Addr | 02-01 | 02-02 | | |
| Dev Group | 03 | | | |
| Vol Addr | '04'x | '05'x | | |
| Vol Status | Online | Online | | |
| Phy Addr | 03-01 | 03-02 | | |
| Dev Group | 04 | | | |
| Vol Addr | '06'x | '07'x | | |
| Vol Status | Online | Online | | |
| Phy Addr | 04-01 | 04-02 | | |
| Dev Group | 05 | | | |
| Vol Addr | '08'x | '09'x | | |
| Vol Status | Online | Online | | |
| Phy Addr | 05-01 | 05-02 | | |
| Dev Group | 06 | | | |
| Vol Addr | '0A'x | '0B'x | | |
| Vol Status | Online | Online | | |
| Phy Addr | 06-01 | 06-02 | | |
| Dev Group | 07 | | | |
| Vol Addr | '0C'x | '0D'x | | |
| Vol Status | Online | Online | | |
| Phy Addr | 07-01 | 07-02 | | |
| Dev Group | 08 | | | |
| Vol Addr | '00'x | '01'x | | |
| Vol Status | Online | Online | | |
| Phy Addr | 08-01 | 08-02 | | |

*Fig. 3D*

| Dev Group | 01 | | | |
|---|---|---|---|---|
| Vol Addr | '00'x | '01'x | | |
| Vol Status | Online | Online | | |
| Phy Addr | 01-01 | 01-02 | 01-03 | 01-04 |
| Dev Group | 02 | | | |
| Vol Addr | '02'x | '03'x | | |
| Vol Status | Online | Online | | |
| Phy Addr | 02-01 | 02-02 | | |
| Dev Group | 03 | | | |
| Vol Addr | '04'x | '05'x | | |
| Vol Status | Online | Online | | |
| Phy Addr | 03-01 | 03-02 | | |
| Dev Group | 04 | | | |
| Vol Addr | '06'x | '07'x | | |
| Vol Status | Online | Online | | |
| Phy Addr | 04-01 | 04-02 | | |
| Dev Group | 05 | | | |
| Vol Addr | '08'x | '09'x | | |
| Vol Status | Online | Online | | |
| Phy Addr | 05-01 | 05-02 | | |
| Dev Group | 06 | | | |
| Vol Addr | '0A'x | '0B'x | | |
| Vol Status | Online | Online | | |
| Phy Addr | 06-01 | 06-02 | | |
| Dev Group | 07 | | | |
| Vol Addr | '0C'x | '0D'x | | |
| Vol Status | Online | Online | | |
| Phy Addr | 07-01 | 07-02 | | |
| Dev Group | 08 | | | |
| Vol Addr | '0E'x | '0F'x | | |
| Vol Status | Unused | Unused | | |
| Phy Addr | 08-01 | 08-02 | | |

*Fig. 3E*

| Dev Group | 01 | | | |
|---|---|---|---|---|
| Vol Addr | '00'x | '01' | '0E'x | '0F'X |
| Vol Status | Online | Online | Unused | Unused |
| Phy Addr | 01-01 | 01-02 | 01-03 | 01-04 |
| Dev Group | 02 | | | |
| Vol Addr | '02'x | '03'x | | |
| Vol Status | Online | Online | | |
| Phy Addr | 02-01 | 02-02 | | |
| Dev Group | 03 | | | |
| Vol Addr | '04'x | '05'x | | |
| Vol Status | Online | Online | | |
| Phy Addr | 03-01 | 03-02 | | |
| Dev Group | 04 | | | |
| Vol Addr | '06'x | '07'x | | |
| Vol Status | Online | Online | | |
| Phy Addr | 04-01 | 04-02 | | |
| Dev Group | 05 | | | |
| Vol Addr | '08'x | '09'x | | |
| Vol Status | Online | Online | | |
| Phy Addr | 05-01 | 05-02 | | |
| Dev Group | 06 | | | |
| Vol Addr | '0A'x | '0B'x | | |
| Vol Status | Online | Online | | |
| Phy Addr | 06-01 | 06-02 | | |
| Dev Group | 07 | | | |
| Vol Addr | '0C'x | '0D'x | | |
| Vol Status | Online | Online | | |
| Phy Addr | 07-01 | 07-02 | | |
| Dev Group | 08 | | | |
| Vol Addr | | | | |
| Vol Status | | | | |
| Phy Addr | 08-01 | 08-02 | | |

*Fig. 3F*

| Dev Group | 01 | | | |
|---|---|---|---|---|
| Vol Addr | '00'x | '01'x | '02'x | '03'X |
| Vol Status | Online | Online | Online | Online |
| Phy Addr | 01-01 | 01-02 | 01-03 | 01-04 |
| Dev Group | 02 | | | |
| Vol Addr | '0E'x | '0F'x | | |
| Vol Status | Unused | Unused | | |
| Phy Addr | 02-01 | 02-02 | | |
| Dev Group | 03 | | | |
| Vol Addr | '04'x | '05'x | | |
| Vol Status | Online | Online | | |
| Phy Addr | 03-01 | 03-02 | | |
| Dev Group | 04 | | | |
| Vol Addr | '06'x | '07'x | | |
| Vol Status | Online | Online | | |
| Phy Addr | 04-01 | 04-02 | | |
| Dev Group | 05 | | | |
| Vol Addr | '08'x | '09'x | | |
| Vol Status | Online | Online | | |
| Phy Addr | 05-01 | 05-02 | | |
| Dev Group | 06 | | | |
| Vol Addr | '0A'x | '0B'x | | |
| Vol Status | Online | Online | | |
| Phy Addr | 06-01 | 06-02 | | |
| Dev Group | 07 | | | |
| Vol Addr | '0C'x | '0D'x | | |
| Vol Status | Online | Online | | |
| Phy Addr | 07-01 | 07-02 | | |
| Dev Group | 08 | | | |
| Vol Addr | | | | |
| Vol Status | | | | |
| Phy Addr | 08-01 | 08-02 | | |

*Fig. 3G*

| Dev Group | 01 | | | |
|---|---|---|---|---|
| Vol Addr | '00'x | '01'x | '02'x | '03'x |
| Vol Status | Online | Online | Online | Online |
| Phy Addr | 01-01 | 01-02 | 01-03 | 01-04 |
| Dev Group | 02 | | | |
| Vol Addr | | | | |
| Vol Status | | | | |
| Phy Addr | | | | |
| Dev Group | 03 | | | |
| Vol Addr | '04'x | '05'x | | |
| Vol Status | Online | Online | | |
| Phy Addr | 03-01 | 03-02 | | |
| Dev Group | 04 | | | |
| Vol Addr | '06'x | '07'x | | |
| Vol Status | Online | Online | | |
| Phy Addr | 04-01 | 04-02 | | |
| Dev Group | 05 | | | |
| Vol Addr | '08'x | '09'x | | |
| Vol Status | Online | Online | | |
| Phy Addr | 05-01 | 05-02 | | |
| Dev Group | 06 | | | |
| Vol Addr | '0A'x | '0B'x | | |
| Vol Status | Online | Online | | |
| Phy Addr | 06-01 | 06-02 | | |
| Dev Group | 07 | | | |
| Vol Addr | '0C'x | '0D'x | | |
| Vol Status | Online | Online | | |
| Phy Addr | 07-01 | 07-02 | | |
| Dev Group | 08 | | | |
| Vol Addr | | | | |
| Vol Status | | | | |
| Phy Addr | 08-01 | 08-02 | | |

*Fig. 3H*

| Dev Group | 01 | | | |
|---|---|---|---|---|
| Vol Addr | '00'x | '01' | '02'x | '03'X |
| Vol Status | Online | Online | Online | Online |
| Phy Addr | 01-01 | 01-02 | 01-03 | 01-04 |
| Dev Group | 02 | | | |
| Vol Addr | '0E'x | '0F'x | | |
| Vol Status | Unused | Unused | | |
| Phy Addr | 02-01 | 02-02 | 02-03 | 02-04 |
| Dev Group | 03 | | | |
| Vol Addr | '04'x | '05'x | | |
| Vol Status | Online | Online | | |
| Phy Addr | 03-01 | 03-02 | | |
| Dev Group | 04 | | | |
| Vol Addr | '06'x | '07'x | | |
| Vol Status | Online | Online | | |
| Phy Addr | 04-01 | 04-02 | | |
| Dev Group | 05 | | | |
| Vol Addr | '08'x | '09'x | | |
| Vol Status | Online | Online | | |
| Phy Addr | 05-01 | 05-02 | | |
| Dev Group | 06 | | | |
| Vol Addr | '0A'x | '0B'x | | |
| Vol Status | Online | Online | | |
| Phy Addr | 06-01 | 06-02 | | |
| Dev Group | 07 | | | |
| Vol Addr | '0C'x | '0D'x | | |
| Vol Status | Online | Online | | |
| Phy Addr | 07-01 | 07-02 | | |
| Dev Group | 08 | | | |
| Vol Addr | | | | |
| Vol Status | | | | |
| Phy Addr | 08-01 | 08-02 | | |

*Fig. 3I*

| Dev Group  | 01     |        |        |        |
|------------|--------|--------|--------|--------|
| Vol Addr   | '00'x  | '01'   | '02'x  | '03'X  |
| Vol Status | Online | Online | Online | Online |
| Phy Addr   | 01-01  | 01-02  | 01-03  | 01-04  |
| Dev Group  | 02     |        |        |        |
| Vol Addr   | '04'x  | '05'   | '06'x  | '07'X  |
| Vol Status | Online | Online | Online | Online |
| Phy Addr   | 02-01  | 02-02  | 02-03  | 02-04  |
| Dev Group  | 03     |        |        |        |
| Vol Addr   | '08'x  | '09'   | '0A'x  | '0B'X  |
| Vol Status | Online | Online | Online | Online |
| Phy Addr   | 03-01  | 03-02  | 03-03  | 03-04  |
| Dev Group  | 04     |        |        |        |
| Vol Addr   | '0C'x  | '0D'   | '0E'x  | '0F'X  |
| Vol Status | Online | Online | Unused | Unused |
| Phy Addr   | 04-01  | 04-02  | 04-03  | 04-04  |
| Dev Group  | 05     |        |        |        |
| Vol Addr   |        |        |        |        |
| Vol Status |        |        |        |        |
| Phy Addr   | 05-01  | 05-02  | 05-03  | 05-04  |
| Dev Group  | 06     |        |        |        |
| Vol Addr   |        |        |        |        |
| Vol Status |        |        |        |        |
| Phy Addr   | 06-01  | 06-02  | 06-03  | 06-04  |
| Dev Group  | 07     |        |        |        |
| Vol Addr   |        |        |        |        |
| Vol Status |        |        |        |        |
| Phy Addr   | 07-01  | 07-02  | 07-03  | 07-04  |
| Dev Group  | 08     |        |        |        |
| Vol Addr   |        |        |        |        |
| Vol Status |        |        |        |        |
| Phy Addr   | 08-01  | 08-02  | 08-03  | 08-04  |

*Fig. 3J*

| | |
|---|---|
| 1E 1F | 1C 1D |
| 1A 1B | 18 19 |
| 16 17 | 14 15 |
| 12 13 | 10 11 |
| 00 01 | 02 03 |
| 04 05 | 06 07 |
| 08 09 | 0A 0B |
| 0C 0D | 0E 0F |
| String 0-32 Volumes | |

*Fig. 4A*

| | |
|---|---|
| 3E 3F | 3C 3D |
| 3A 3B | 38 39 |
| 36 37 | 34 35 |
| 32 33 | 30 31 |
| 20 21 | 22 23 |
| 24 25 | 26 27 |
| 28 29 | 2A 2B |
| 2C 2D | 2E 2F |
| String 1-32 Volumes | |

*Fig. 4B*

| | |
|---|---|
| 00 01 | 1C 1D |
| 1A 1B | 18 19 |
| 16 17 | 14 15 |
| 12 13 | 10 11 |
| X X X X | 02 03 |
| 04 05 | 06 07 |
| 08 09 | 0A 0B |
| 0C 0D | 0E 0F |
| String 0-32 Volumes | |

*Fig. 4C*

| | |
|---|---|
| 3E 3F | 3C 3D |
| 3A 3B | 38 39 |
| 36 37 | 34 35 |
| 32 33 | 30 31 |
| 20 21 | 22 23 |
| 24 25 | 26 27 |
| 28 29 | 2A 2B |
| 2C 2D | 2E 2F |
| String 1-32 Volumes | |

*Fig. 4D*

| | |
|---|---|
| X X | 1C 1D |
| 1A 1B | 18 19 |
| 16 17 | 14 15 |
| 12 13 | 10 11 |
| 00 01 1E 1F | 02 03 |
| 04 05 | 06 07 |
| 08 09 | 0A 0B |
| 0C 0D | 0E 0F |
| String 0-32 Volumes | |

*Fig. 4E*

| | |
|---|---|
| 3E 3F | 3C 3D |
| 3A 3B | 38 39 |
| 36 37 | 34 35 |
| 32 33 | 30 31 |
| 20 21 | 22 23 |
| 24 25 | 26 27 |
| 28 29 | 2A 2B |
| 2C 2D | 2E 2F |
| String 1-32 Volumes | |

*Fig. 4F*

| | |
|---|---|
| X X | 1C 1D |
| 1A 1B | 18 19 |
| 16 17 | 14 15 |
| 12 13 | 10 11 |
| 00 01 02 03 | 1E 1F X X |
| 04 05 | 06 07 |
| 08 09 | 0A 0B |
| 0C 0D | 0E 0F |
| String 0-32 Volumes | |

*Fig. 4G*

| | |
|---|---|
| 3E 3F | 3C 3D |
| 3A 3B | 38 39 |
| 36 37 | 34 35 |
| 32 33 | 30 31 |
| 20 21 | 22 23 |
| 24 25 | 26 27 |
| 28 29 | 2A 2B |
| 2C 2D | 2E 2F |
| String 1-32 Volumes | |

*Fig. 4H*

| | |
|---|---|
| X X | 1C 1D |
| 1A 1B | 18 19 |
| 16 17 | 14 15 |
| 12 13 | 10 11 |
| 00 01 02 03 | 04 05 1E 1F |
| X X | 06 07 |
| 08 09 | 0A 0B |
| 0C 0D | 0E 0F |
| String 0-32 Volumes | |

*Fig. 4I*

| | |
|---|---|
| 3E 3F | 3C 3D |
| 3A 3B | 38 39 |
| 36 37 | 34 35 |
| 32 33 | 30 31 |
| 20 21 | 22 23 |
| 24 25 | 26 27 |
| 28 29 | 2A 2B |
| 2C 2D | 2E 2F |
| String 1-32 Volumes | |

*Fig. 4J*

| | |
|---|---|
| X X | 1C 1D |
| 1A 1B | 18 19 |
| 16 17 | 14 15 |
| 12 13 | 10 11 |
| 00 01 02 03 | 04 05 06 07 |
| 1E 1F | 06 07 |
| 08 09 | 0A 0B |
| 0C 0D | 0E 0F |
| String 0-32 Volumes | |

*Fig. 4K*

| | |
|---|---|
| 3E 3F | 3C 3D |
| 3A 3B | 38 39 |
| 36 37 | 34 35 |
| 32 33 | 30 31 |
| 20 21 | 22 23 |
| 24 25 | 26 27 |
| 28 29 | 2A 2B |
| 2C 2D | 2E 2F |
| String 1-32 Volumes | |

*Fig. 4L*

| X X | X X |
|---|---|
| X X | X X |
| X X | X X |
| X X | X X |
| 00 01 02 03 | 04 05 06 07 |
| 08 09 0A 0B | 0C 0D 0E 0F |
| 10 11 12 13 | 14 15 16 17 |
| 18 19 1A 1B | 1C 1D 1E 1F |
| String 0-32 Volumes ||

*Fig. 4M*

| 3E 3F | 3C 3D |
|---|---|
| 3A 3B | 38 39 |
| 36 37 | 34 35 |
| 32 33 | 30 31 |
| 20 21 | 22 23 |
| 24 25 | 26 27 |
| 28 29 | 2A 2B |
| 2C 2D | 2E 2F |
| String 1-32 Volumes ||

*Fig. 4N*

| X X X X | X X X X |
|---|---|
| X X X X | X X X X |
| X X X X | X X X X |
| X X X X | X X X X |
| 00 01 02 03 | 04 05 06 07 |
| 08 09 0A 0B | 0C 0D 0E 0F |
| 10 11 12 13 | 14 15 16 17 |
| 18 19 1A 1B | 1C 1D 1E 1F |
| String 0-32 Volumes ||

*Fig. 4O*

| 3E 3F | 3C 3D |
|---|---|
| 3A 3B | 38 39 |
| 36 37 | 34 35 |
| 32 33 | 30 31 |
| 20 21 | 22 23 |
| 24 25 | 26 27 |
| 28 29 | 2A 2B |
| 2C 2D | 2E 2F |
| String 1-32 Volumes ||

*Fig. 4P*

| X X X X | X X X X |
|---|---|
| X X X X | X X X X |
| X X X X | X X X X |
| X X X X | 1E 1F X X |
| 00 01 02 03 | 04 05 06 07 |
| 08 09 0A 0B | 0C 0D 0E 0F |
| 10 11 12 13 | 14 15 16 17 |
| 18 19 1A 1B | 1C 1D X X |
| String 0-32 Volumes ||

*Fig. 4Q*

| 3E 3F | 3C 3D |
|---|---|
| 3A 3B | 38 39 |
| 36 37 | 34 35 |
| 32 33 | 30 31 |
| 20 21 | 22 23 |
| 24 25 | 26 27 |
| 28 29 | 2A 2B |
| 2C 2D | 2E 2F |
| String 1-32 Volumes ||

*Fig. 4R*

| | |
|---|---|
| X X X X | X X X X |
| X X X X | X X X X |
| X X X X | X X X X |
| X X X X | 20 21 1E 1F |
| 00 01 02 03 | 04 05 06 07 |
| 08 09 0A 0B | 0C 0D 0E 0F |
| 10 11 12 13 | 14 15 16 17 |
| 18 19 1A 1B | 1C 1D X X |
| String 0-34 Volumes | |

*Fig. 4S*

| | |
|---|---|
| 3E 3F | 3C 3D |
| 3A 3B | 38 39 |
| 36 37 | 34 35 |
| 32 33 | 30 31 |
| X X | 22 23 |
| 24 25 | 26 27 |
| 28 29 | 2A 2B |
| 2C 2D | 2E 2F |
| String 1-30 Volumes | |

*Fig. 4T*

| | |
|---|---|
| X X X X | X X X X |
| X X X X | X X X X |
| X X X X | X X X X |
| 1E 1F X X | 20 21 22 23 |
| 00 01 02 03 | 04 05 06 07 |
| 08 09 0A 0B | 0C 0D 0E 0F |
| 10 11 12 13 | 14 15 16 17 |
| 18 19 1A 1B | 1C 1D X X |
| String 0-36 Volumes | |

*Fig. 4U*

| | |
|---|---|
| 3E 3F | 3C 3D |
| 3A 3B | 38 39 |
| 36 37 | 34 35 |
| 32 33 | 30 31 |
| X X | X X |
| 24 25 | 26 27 |
| 28 29 | 2A 2B |
| 2C 2D | 2E 2F |
| String 1-28 Volumes | |

*Fig. 4V*

| | |
|---|---|
| 3C 3D 3E 3F | 38 39 3A 3B |
| 34 35 36 37 | 30 31 32 33 |
| 2C 2D 2E 2F | 28 29 2A 2B |
| 24 25 26 27 | 20 21 22 23 |
| 00 01 02 03 | 04 05 06 07 |
| 08 09 0A 0B | 0C 0D 0E 0F |
| 10 11 12 13 | 14 15 16 17 |
| 18 19 1A 1B | 1C 1D 1E 1F |
| String 0-64 Volumes | |

*Fig. 4W*

| | |
|---|---|
| X X | X X |
| X X | X X |
| X X | X X |
| X X | X X |
| X X | X X |
| X X | X X |
| X X | X X |
| X X | X X |
| String 1-0 Volumes | |

*Fig. 4X*

| | |
|---|---|
| 3C 3D 3E 3F | 38 39 3A 3B |
| 34 35 36 37 | 30 31 32 33 |
| 2C 2D 2E 2F | 28 29 2A 2B |
| 24 25 26 27 | 20 21 22 23 |
| 00 01 02 03 | 04 05 06 07 |
| 08 09 0A 0B | 0C 0D 0E 0F |
| 10 11 12 13 | 14 15 16 17 |
| 18 19 1A 1B | 1C 1D 1E 1F |
| String 0-64 Volumes | |

*Fig. 4Y*

| | |
|---|---|
| X X X X | X X X X |
| X X X X | X X X X |
| X X X X | X X X X |
| X X X X | X X X X |
| X X X X | X X X X |
| X X X X | X X X X |
| X X X X | X X X X |
| X X X X | X X X X |
| String 1-0 Volumes | |

*Fig. 4Z*

METHOD AND SYSTEM FOR MAINTAINING CONCURRENT DATA ACCESS DURING DEVICE UPGRADE

This is a continuation of application Ser. No. 08/261,797, filed Jun. 20, 1994, abandoned.

BACKGROUND OF THE INVENTION

1. Technical Field

The invention relates to data storage systems for data processing systems, and, more particularly, to storage controllers for disk drives serving a plurality of host main frame computers. More specifically still, the invention relates to the ability to upgrade previously installed disk drives while maintaining continuous access to data residing on the disks being upgraded.

2. Description of the Related Art

Main frame computer systems generally use auxiliary storage devices for mass storage of data. In auxiliary storage devices data is recorded by making a physical change to a medium. Examples of physical storage of data on media are: pitting of aluminum by lasers; grooving of a plastic disk by a needle; and forming magnetic domains on a magnetic surface with an electromagnet. A transducer can then be used to sense the physical qualities of the media and to produce an electrical signal which varies in correspondence to the physical qualities of the media. For a data processing system or compact disk player, the electrical signal is decoded to reproduce binary data.

Direct Access Storage Devices (DASD, pronounced "dasdee") are one type of auxiliary storage device. In a direct access storage device access time to data is independent of the location of the data in the storage device. Presently, disk drive units are the most common type of DASD. A disk drive unit records data on rotatable disks. The write and read transducers are moved radially inward and outward relative to the disk and the disk is rotated to bring any location of the disk and the appropriate transducer into proximity with one another. A DASD may be contrasted to an indirect access storage device, such as tape drives, where accessibility of data is location dependent.

The fact that access time to a location on a disk is more or less random does not mean that it is instantaneous. During a period when a DASD waits for a spinning disk to move to the correct position for a transducer to access a location, a storage controller for the DASD can perform other functions. An example of a function performed during a waiting period is the downloading of data from a buffer memory to a channel to a host computer.

The Storage Controller is connected to the host computers via physical links called Channels. Usually a given host computer will have at least two, or multiple groups of two, Channel connections to each storage controller. The Storage Controller is connected to the DASD by physical link generally referred to as Storage Paths. The DASD connected to the storage controller are organized into addressable units called volumes. Each individual storage path is connected to all the DASD volumes. The storage controller manages the connections between channels and storage paths.

Examples of Storage Subsystems include the IBM 3990/3390, and the IBM 9343/9345. The IBM 3990/3390 has sixteen channel connections to the host computer and four storage paths connecting up to sixty-four DASD volumes. The IBM 9343/9345 has four channel connections and four storage paths connecting up to thirty-two DASD volumes.

In some storage subsystems, the DASD volumes are physically arranged in units called Strings. In current implementations, each string always has a fixed maximum number of volumes.

Upon indication that a DASD volume is ready, the storage controller can secure any one of a plurality of the channels and storage paths back to a host to establish a data path. It is a feature of storage controllers that an input/output transaction between a host computer and a magnetic disk unit may be broken into two separate connections, which may be handled along distinct channels and storage paths. A request need not be responded to over the same channel on which it was received. This feature increases throughput through the storage controller, because during the disconnect period the storage controller handles other tasks, such as a connection for another computer with another DASD.

While each storage path is in effect a stand alone control unit based upon its own microprocessor, the storage paths share control information through a common memory space for synchronization functions relating to handling connections, disconnections and reconnections relating to a transaction. Each storage path in a storage controller has access to memory devices used for supporting storage control unit operation.

Generally, the storage controllers support a concept of a Channel Connection Address (CCA) and Logical Device Address (LDA). The CCA is the address known by the host system. When attaching previous devices, the LDA defines the physical device (each physical device having a logical volume) and the internal control block within the control unit assigned to the device. The LDA is then translated into the address used to communicate with the storage controller to access the storage device. When a string of DASDs is installed, the CCAs and LDAs are assigned for all possible devices in the string, even if some devices were not installed.

The storage controllers save the subsystem configuration information in a non-volatile storage. This configuration contains such information as the number of device groups installed, the number of volumes installed, the maximum number of volumes allowed in the subsystem, and the CCA to LDA address assignments. Redundant copies of this information are kept in the subsystem. This configuration information is used to initialize the storage subsystem whenever an Initial Microprogram Load (IML) occurs, for example, when the system is first powered up.

The CCA/LDA concept is required to support the 3990 dual copy function. When a duplex pair is established and the primary device fails, the 3990 storage controller swaps the primary and secondary devices by assigning the CCA of the primary to the secondary device. This allows host processing to continue without interruption. A similar CCA/LDA mapping concept is required to support the 93xx storage controller mirroring functions.

IBM storage controllers allow the attaching of DASD volumes that are configured in a plurality of device groups or drawers, with the entire set of drawers being physically mounted within a rack. Each rack can contain up to sixteen drawers. In the prior art, each drawer has the number of volumes fixed at two.

Furthermore, system customers typically desire to upgrade the previously installed products. This involves several problems, most important of which is maintaining access to the data during the upgrading procedure. This is especially difficult since the data on a device to be upgraded must be moved to an alternate storage device or medium. The moving of the data causes disruption to the customer operations that is otherwise unacceptable. Accordingly, what is needed is a system and method for managing the storage devices to maintain concurrent data access to data during an upgrade procedure.

Since the prior systems require the number of volumes to be fixed at two per device group or drawer, and one type of desirable upgrade is to increase the number of volumes per drawer, what is needed is a storage controller that is able to support varying numbers of volumes per drawer. In addition, the storage controller must be able to support the conversion of the number of volumes within a drawer.

SUMMARY OF THE INVENTION

It is an object of the invention to provide an improved method and system for mass storage of data on a data processing system.

It is another object of the invention to provide an improved method and system for controlling disk drives serving a plurality of host main frame computers.

It is still another object of the invention to provide a method and system for upgrading disk drives or other devices while maintaining continuous accessed data residing on the disks being upgraded.

According to the present invention, a system and method for changing the number of logical volumes in a drawer in a rack in a direct access storage device subsystem is disclosed. The method and system are able to change the number of logical volumes without disrupting access to the other logical volumes in the rack. Channel connection addresses, which are logical volume addresses as known by the CPUs, are freed by removing the old drawer and then are reused. If the new drawer has more logical volumes than the old drawer, the next unused channel connection addresses are used with the new drawer. In a subsystem having a storage controller for providing control for a plurality of direct access storage devices, the logical volumes are spread across multiple physical devices. The storage controller maintains configuration data for the entire subsystem in redundant, non-volatile storage locations reserved specifically for its use. The rack, the storage controller, and the attaching CPUs may address each logical volume differently. The subsystem configuration information contains the three different addresses for each logical volume in the subsystem.

Each logical volume address for the rack is set by the drawer location and the logical sequence of the volumes within the drawer. As drawers are installed, the control unit sequentially assigns the volume addresses for the control unit and the channel connection addresses for the CPUs.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3J are tables of the logical mapping during the various stages of conversion following the procedure depicted in FIG. 2;

FIGS. 4A–4Z depicts a second embodiment of the stages of conversion of a system undergoing upgrading according to the procedure of FIG. 2.

DETAILED DESCRIPTION OF THE INVENTION

Figure 1:
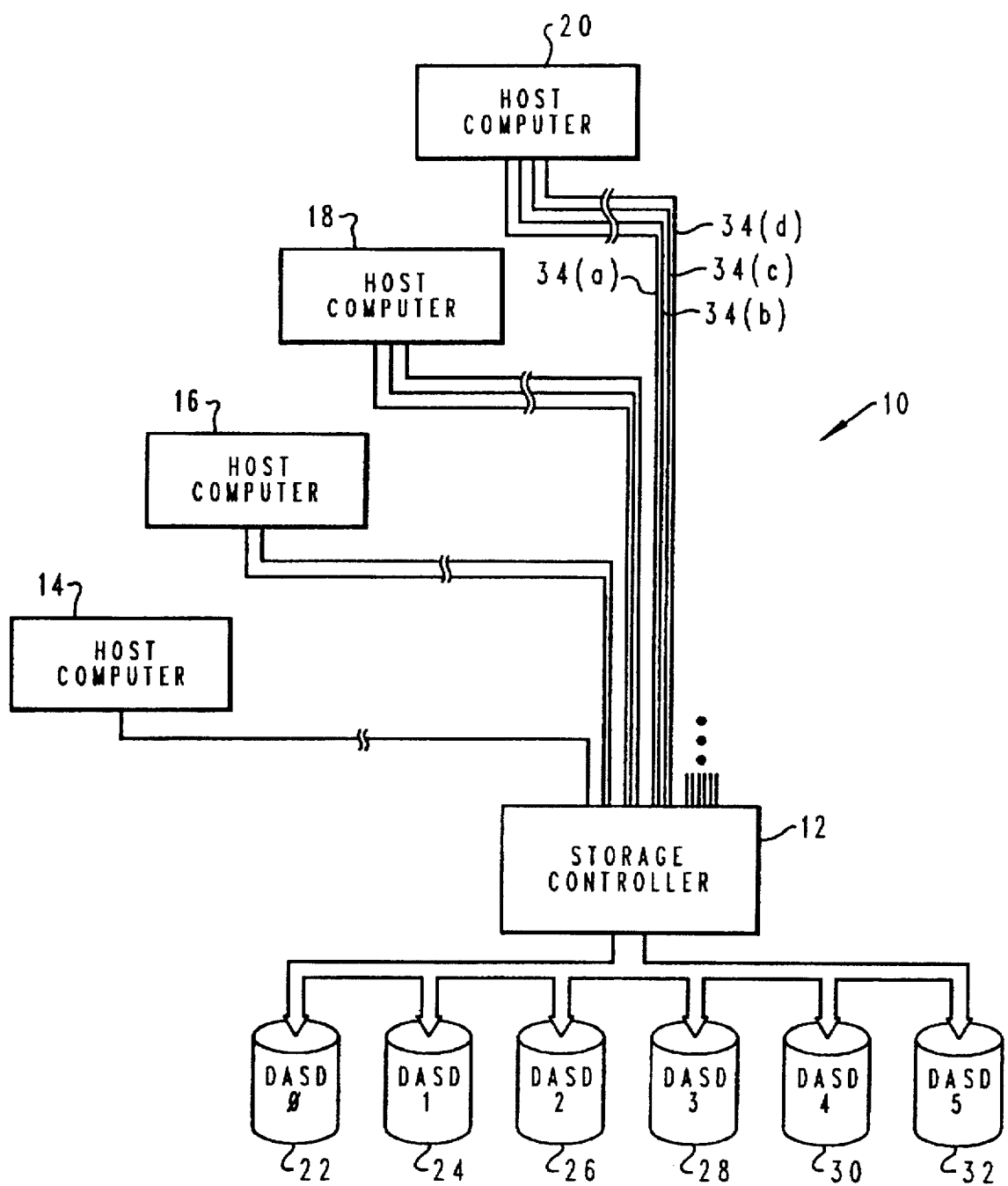
FIG. 1 is a block diagram of a data processing system which may be utilized to implement the method and system of the present invention.

With reference now to the figures and in particular with reference to FIG. 1, there is depicted a high level block diagram of a data processing system 10. Data processing system includes a storage controller 12, a plurality of host computers 14, 16, 18 and 20 and a plurality of direct access storage devices (DASD) 22–32. Direct access storage units 22–32 are generally magnetic storage units, such as disk drives. Storage units 22–32 are also connected to storage controller 12 for selective connection for communication with host computers. Storage controller 12 is preferably an IBM type controller, which is available from IBM Corporation. Host computers 14–20 are typically main frame systems such as the IBM 3090, the ES9000 Model computer, or comparable systems. Host computers 14–20 are connected to storage controller 12 with at least one and up to four channels. For example, host computer 20 is connected to storage controller 12 by channels 34(a), 34(b), 34(c) and 34(d). The channels come in two types, parallel data channels and serial data channels. Certain optical serial channels are used for data transmission up to 15 kilometers. Parallel channels utilize electrical signals and are generally not used at distances of greater than about 125 meters.

The plurality of DASDs are configured into drawers within a rack. Each rack contains up to 16 drawers and each drawer has at least two volumes. To ensure stability of the rack, drawers are installed in the following order: 8–15, 7–0. To use the conventional device addressing scheme, all the drawers in a rack need to contain the same number of logical volumes. With this restriction, the address of the logical volumes is known. With all two logical volume drawers installed, the control unit can be set for 32 device addressing and the first two volume drawer installed (drawer 8) then has addresses X10 and X11. If an upgrade is performed such that a drawer contains four logical volumes, the control unit then can be set for 64 device addressing and the first four volume drawer installed would contain device addresses X20, X21, X22, and X23. In both cases, the device addresses from 00 to the first installed storage device would be required to be defined by the host, but would not necessarily have to be used. Each drawer has four (4) physical device addresses (PDA). The PDAs are assigned incrementally beginning with 0 through 3, as illustrated in FIG. 3A.

Several problems occur in converting from two volume drawers to more than two volume drawers or vice versa. First, the addresses of the logical volumes must be determined that contain the non-volatile storage during initial program load (IML). Next, the system must determine if a configuration change occurred within the rack while the storage controller was powered down. Additionally, the system must convert the number of logical volumes within a drawer without affecting the other drawers. Finally, the system must allow less than the maximum subsystem configuration without wasting string device addresses.

These problems are overcome by assigning the CCA/ LDAs, starting with the lowest available address, to the drawers as they are installed. This provides an LDA to physical device address (PDA) mapping. This mapping is added to the non-volatile configuration data non-volatile configuration data. The LDA is used to assign internal control blocks to each device, but the LDA must be converted to a PDA before the address sent to the device adapter can be determined.

The PDAs of the two devices containing non-volatile storage data are then added to the control unit vital product data (VPD). During the IML process, the storage controller reads the LDAs and PDAs of the non-volatile storage device and restores the state of the subsystem. Furthermore, the storage controller checks to ensure that the DASD configuration has not changed. If the configuration has changed, the LDA/PDA conversion table is then updated to reflect the new configuration.

When a drawer is removed, the LDAs associated with the removed drawer are marked on the status tracks as being available. These LDAs are then reassigned whenever the next drawer is installed.

Table I defines the logical volume's addresses for a rack that contains four drawers with two logical volumes in each drawer. The table illustrates a one to one mapping between logical volume addresses known by the control unit and the CPUs. The correspondence is maintained unless a dual copy operation occurs, which swaps devices.

TABLE I

Device Addressing with Variable Drawer Configuration

| Drawer Number | | Addressing | | | |
|---|---|---|---|---|---|
| 00 | CPU | 00 | 01 | — | — |
|  | Control Unit | 00 | 01 | — | — |
|  | Rack | 20 | 21 | — | — |
| 01 | CPU | 02 | 03 | — | — |
|  | Control Unit | 02 | 03 | — | — |
|  | Rack | 24 | 25 | — | — |
| 02 | CPU | 04 | 05 | — | — |
|  | Control Unit | 04 | 05 | — | — |
|  | Rack | 28 | 29 | — | — |
| 03 | CPU | 06 | 07 | — | — |
|  | Control Unit | 06 | 07 | — | — |
|  | Rack | 2C | 2D | — | — |

To change the number of logical volumes in a drawer, the drawer must first be installed or removed. Upon removal, the storage controller updates the non-volatile configuration to indicate that the logical volume's addresses used by the storage controller and the CPUs are now unused. Next, the system installs the drawer with a different number of logical volumes. The storage controller uses the non-volatile configuration data to find the lowest available addresses to be used for the control unit or the storage controller and the CPUs. The storage controller takes into consideration is that the address the logical volumes for the rack are fixed by drawer location and sequence within the drawer.

Table II illustrates the addressing after an upgraded four logical volume drawer has replaced a two logical volume drawer in drawer number 00. In this case, the two addresses freed when the two logical volume drawer was removed are first used and then two addresses that were not previously used are assigned to the remaining two volume drawers. The table also shows an example where dual copy has been used to swap logical volumes 2 and 7.

TABLE II

Device Addressing with Variable Drawer Configuration

| Drawer Number | | Addressing | | | |
|---|---|---|---|---|---|
| 00 | CPU | 00 | 01 | 08 | 09 |
|  | Control Unit | 00 | 01 | 08 | 09 |
|  | Rack | 20 | 21 | 22 | 23 |
| 01 | CPU | 07 | 03 | — | — |
|  | Control Unit | 02 | 03 | — | — |
|  | Rack | 24 | 25 | — | — |
| 02 | CPU | 04 | 05 | — | — |
|  | Control Unit | 04 | 05 | — | — |
|  | Rack | 28 | 29 | — | — |
| 03 | CPU | 06 | 02 | — | — |
|  | Control Unit | 06 | 07 | — | — |
|  | Rack | 2C | 2D | — | — |

The ability to bury the addressing within variable drawer configurations is of great importance during the upgrading of the storage devices during operation.

It has been noted that upgrading previously installed storage devices or other system requirements that require data to be moved to an alternate device medium are very disruptive to a customer and the business operations of that customer. It is desirable for that customer to continue with operations during any upgrade procedure. Examples of upgrades to previously installed disk drives include upgrading the subsystem capacity, upgrading the device capacity, the logic hardware, disk drive or microcode technology. Additional upgrades may include upgrading the performance characteristics of the disk drives, environmental impact of the devices, or new installations. The storage controller manages the subsystem storage device upgrade. The storage controller is capable of maintaining concurrent data access by using unused devices during the upgrade procedure. The storage controller is capable of reconfiguring the string size of any DASD string, which initially has a fixed number of device addresses assigned to the string. The microcode used in the storage controller allows the string size to change dynamically, which allows migration of data between strings when multiple strings are present, up to the maximum number of devices per subsystem. This also removes the current limits on the fixed number of volumes per string. The storage controller also provides physical device management. The storage controller manages a larger number of physical devices than the maximum allowed by the subsystem's original configuration. These physical devices are managed in an off-line mode to keep the upgraded configuration from exceeding the maximum number of logical devices allowed by the original subsystem configuration.

The storage controller also copies data between the devices, preferably from the designated device to be replaced or upgraded to a device that is currently unused. Different types of copy processes are used, such as, for example, dual copy, dynamic sparing, or mirroring, which are well known in the art, and which aid in maintaining access to data during on-line mode of data transfer between devices.

The storage controller also must be able to provide logical to physical device addressing. The logical to physical device addressing provides dynamic assignment of unused subsystem device addresses to newly installed devices and allows continuous access to physically relocated data by remapping the physical to logical device addresses.

The above capabilities then allow the removal of the logical device of the designated storage device for upgrading. The process logically removes a logical volume from the subsystem configuration. Any unused devices represent volumes that are installed in the subsystem, but not in use by the customer for data storage. These may be used later according to the customers needs.

Figure 2:
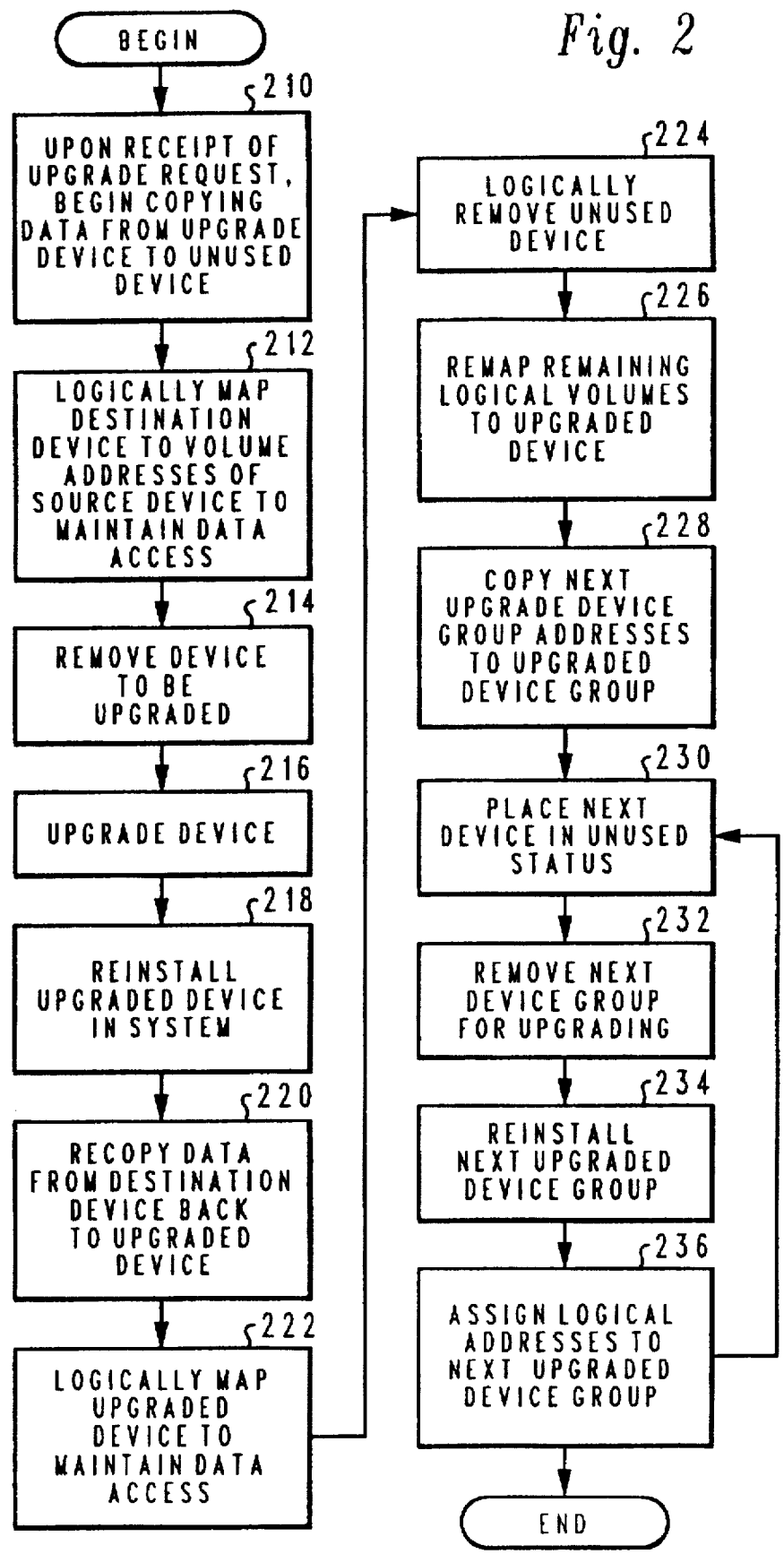
FIG. 2 depicts a flowchart of the steps used in maintaining the storage device subsystem according to the present invention.

An example of the upgrade procedure is depicted in FIG. 2, which is a flowchart of the steps involved, and is illustrated in FIGS. 3A–3J, which show the stages of the system configuration during upgrade. In FIG. 3A, the original system configuration is shown. For the purposes of example, the starting subsystem contains eight (8) device groups with a maximum of 16 logical addresses. Device groups 1–7 are on line while device group 8 is currently unused. In step 210, the system receives a request for device upgrade and then begins copying the data in the device to be upgraded, in this example in FIG. 3B, device group 1, the data is copied to the unused device group, which is device group 8. The subsystem copy process maintains access to data during and after the copy process. After the subsystem copy is complete, device group 1 becomes a spare device group. In step 212, device group 8 is then logically mapped to volume addresses 00x and 01x, which were originally assigned to device group 1 to maintain data access to the volumes. Meanwhile, device group 1 now has volume addresses 0Ex and 0Fx, which were originally assigned to device group 8 and are spare volumes unused by the customer. Also, the volume status of device group 1 is unused while the volume status of device group 8 is on-line. Next, in step 214, the device group to be upgraded, device group 1 is then removed. This is illustrated in FIG. 3C.

The next step, step 216, upgrades device group 1, and in this case the upgrade involves increases the number of volumes that device group 1 is capable of servicing. For example, the upgrading of the device group causes the number of logical volumes to change from two to four volumes. Next, in step 218, device group 1 is reinstalled in the subsystem. Importantly, only two of the logical devices for device group 1 are installed at this time. This is illustrated in FIG. 3D.

During the next step, step 220, the subsystem copy process is performed again to copy the data from the logical device addresses 00x and 01x to the unused devices in device group 1. The subsystem copy process maintains access to data during and after the copy process. After the subsystem copy is completed, device controller 8 becomes an unused device group. Device group 1 then is logically mapped to volume addresses 00x and 01x to maintain data access to the volumes as illustrated in step 222. The completion of this process is illustrated in FIG. 3E. The volume status for device group 1 is now on-line while the volume status for device group 8 is now unused. In addition, the physical addresses for device group 1 have been increased from two addresses to four addresses.

The next step, step 224, logically removes the previously unused device group, device group 8. The logical addresses originally assigned to this device group are then remapped to the remaining logical volumes in the upgraded device group, device group 1, see step 226. This process is illustrated in FIG. 2. In FIG. 3F, the volume status of the added logical addresses to device group 1 are unused.

Next, in step 228, the subsystem copies device group two's logical addresses to device group one's logical addresses 0Ex and 0Fx. The subsystem copy process maintains access to data during and after the copy process. After the subsystem copy is completed, in step 230, the device group two becomes an unused device group, as illustrated in FIG. 3G in the volume status. During this procedure, device group 1 has been logically mapped to volume addresses 00x, 01x, 02x, and 03x to maintain data access to the volumes.

Next, in step 232, device group 2 is removed for upgrading. This is illustrated in FIG. 3H. Once device group 2 is upgraded, which in this example covers the upgrading of the volumes in device group 2, it is reinstalled into the subsystem, in step 234. During initial reinstallation, only two of the logical devices for device group 2 are installed at this time. The system, in step 236, then assigns logical addresses 0Ex and 0Fx to device group 2. This is shown in FIG. 3I where the volume status for device group 2 is still unused.

The above process may be repeated for all volumes until all are converted. The essential steps include subsystem copying of the volumes from the next low capacity device controller to the spare device controller; next, remove the low capacity device controller; finally, upgrade the low capacity controller to a high capacity device controller. Once all units have been upgraded, the original data is now contained in device groups 1, 2, 3, and 4. The logical mapping and physical address as well as volume status is illustrated in FIG. 3J.

An alternative embodiment is illustrated in sequential FIGS. 4A–4Z. FIGS. 4A–4Z illustrate the upgrade procedure for a two string 3990/9391/9392 subsystem. The invention is also applicable for use in the single string 9394/9395 subsystems manufactured by IBM. For purposes of the illustration, each number in the figures represents a logical device address in hexx. Addresses 1E and 1F are unused, and the maximum number of logical device addresses is 64 for the subsystem. "X" is a physical volume that is not installed.

The starting configuration is illustrated in FIGS. 4A and 4B. String 0 is the first string and includes 32 volumes and string 1 is the second string and is a 9391/9392 or 3390 subsystem and includes 32 volumes as well. If a 9394/9395 subsystem is used, then only one string is used according to the process outlined in the flowcharts of FIG. 2. The subsystem copies data from volumes 00 and 01 to physical locations for volumes 1E and 1F, respectively. Next, the user upgrades the original physical device group for volumes 00 and 01 as illustrated in FIGS. 4C and 4D. Volumes 1E and 1F then reside on the first two volumes of the upgraded device group 1. Next, the system copies device address 00 and 01 to 1E and 1F, respectively. Next, the system swaps logical addresses 00 and 01 for 1E and 1F respectively. Finally, the system assigns addresses 1E and 1F to the remaining volumes in the upgrading drawer. This is illustrated in FIG. 4E and 4F.

The system then proceeds to copy data from volumes 02 and 03 to physical location for volumes 1E and 1F, respectively. The original physical device group for volumes 02 and 03 is then upgraded. Next, the system proceeds to assign volumes 1E and 1F to the first two volumes of the upgraded drawer as illustrated in FIGS. 4G and 4H. Next, the subsystem copies device addresses 04 and 05 to 1E and 1F, respectively. Then, the system proceeds to swap logical addresses 04 and 05 with 1E and 1F, respectively. Next, the system assigns addresses 1E and 1F to the remaining volumes in the upgraded drawer as illustrated in FIGS. 4I and 4J.

The system continues by copying data from volume 06 and 07 to physical location for volumes 1E and 1F, respectively. The original physical device group for volumes 04 and 05 is then upgraded. Next, the system assigns volumes 1E and 1F to the first two volumes of the upgraded drawer as illustrated in FIG. 4K and 4L.

This process is repeated to update all the drawers with subsystem copying of the data until volumes 00 through 1F have been moved to the bottom half of the rack as illustrated in FIGS. 4M and 4N. Then, the device groups in the top half of the rack are upgraded following the same procedures and as illustrated in FIGS. 4O and 4P. The system continues to assign logical devices 1E and 1F as temporary addresses during the upgrade procedure and this is illustrated in FIGS. 4Q and 4R.

Next, the system copies volumes 20 and 21 to the location shown in FIG. 4S while assigning address 1E and 1F to the next available addresses in the same volume. Thus, string 0 now has 34 volumes and string 1 has 30 volumes as illustrated in FIGS. 4S and 4T, respectively.

Next, the subsystem copies volumes 22 and 23 to the location shown in FIG. 4U. Next, the system assigns addresses 1E and 1F in the volume adjacent volumes 22 and 23. At this stage, string 0 has 36 volumes and string 1 has 28 volumes as shown in FIGS. 4U and 4V. This routine is repeated by copying two volumes at a time until the final configuration is achieved in FIGS. 4W and 4X where string 0 has 64 volumes and string 1 has 0 volumes. Now that string 1 has 0 volumes, it can be removed and updated off-line if desired as shown in FIGS. 4Y and 4Z.

Although the above disclosure has been directed towards the application in direct access storage devices, the improved method and system are also applicable to memory upgrades in data processing equipment as well as processor upgrades or the addition of more processors in a parallel processing network.

While the invention has been particularly shown and described with reference to a preferred embodiment, it will be understood by those skilled in the art that various changes in form and detail may be made therein without departing from the spirit and scope of the invention.

What is claimed is:

1. In a data storage system including a plurality of direct access storage devices, each having a fixed number of unique addresses and the same number of logical volumes, and a storage controller being connected to each of the plurality of direct access storage devices, a method of maintaining concurrent data access while upgrading at least one of said plurality of direct access storage devices containing data and coupled to a host computer via a channel comprising the steps of:

responsive to receipt of a request to upgrade said at least one of said plurality of direct access storage devices data over a channel, copying said data to another one of said plurality of direct access storage devices having no data;

logically mapping said fixed number of unique addresses of said at least one of said plurality of direct access storage devices to said another one of said plurality of direct access storage devices to which said data has been copied;

removing said at least one of said plurality of direct access storage devices;

upgrading said at least one of said plurality of direct access storage devices with a direct access storage device having a greater number of unique addresses;

reconfiguring said storage controller to accommodate said greater number of unique addresses;

recopying said data to said upgraded direct access storage device into said greater number of unique addresses; and logically remapping said unique addresses of said another of said plurality of direct access storage devices to said greater number of unique addresses of said upgraded direct access storage to which said data has been recopied.

2. A method as set forth in claim 1, further comprising the step of logically removing said another of said plurality of direct access storage devices.

3. A method as set forth in claim 1, wherein said step of upgrading at least one of said plurality of direct access storage devices includes the step of changing the number of logical volumes controlled by said storage controller before being upgraded.

4. A method as set forth in claim 1, including the step of sequentially assigning logical addresses based on the first address available to said upgraded direct access storage device.

5. In a data processing system having a plurality of host computers, a storage system including a plurality of direct access storage devices, each having a fixed number of logical addresses, and a storage controller, the storage controller being connected to each of the plurality of direct access storage devices by a storage path and to each of the host computers by at least a first channel and further capable of managing a fixed number of logical addresses, and of managing the upgrading of at least one of said direct access storage devices, the storage controller comprising:

means responsive to receipt of an upgrade request for dynamically increasing the number of logical addresses associated with at least one of said plurality of direct access storage devices;

means for copying data between any two of said plurality of direct access storage devices;

means for reassigning the logical address from one of said plurality of said direct access storage devices to a second one of said plurality of said direct access storage devices receiving said data so as to maintain access to said data during an on-line condition; and means for logically removing said at least one of said plurality of direct access storage devices thereby allowing said means for dynamically increasing the number of logical addresses to increase the number of logical addresses corresponding to said at least one of said plurality of direct access storage devices when replaced with a direct access storage device having a greater fixed number of addresses, such that data be may stored within a greater fixed number of addresses within said replacement direct access storage device.

6. The invention as set forth in claim 5, wherein said means for copying data is further capable of copying data between any pair of direct access storage devices.

7. The invention as set forth in claim 5, wherein said means for copying data between direct access storage devices uses a dual copy process.

8. The invention as set forth in claim 5, wherein said means for copying data between direct access storage devices uses a dynamic sparing process.

9. The invention as set forth in claim 5, wherein said means for copying data between direct access storage devices uses a mirroring process.

10. The invention as set forth in claim 5 further comprising means for changing the number of physical storage devices managed by said data processing system.

11. The invention as set forth in claim 10, wherein said means for changing the number of physical storage devices is responsive to a request to change the number of physical storage devices based on the upgrading of said at least one of said direct access storage devices.

12. The invention as set forth in claim 5, wherein said logical addresses follow a sequential order and said means for reassigning logical addresses selects the first available logical address according to said sequence.

13. The invention as set forth in claim 12, wherein said first available logical address is selected from a one of said plurality of direct access storage devices currently unused.

* * * * *